United States Patent [19]

Brower et al.

[11] Patent Number: 4,953,485
[45] Date of Patent: Sep. 4, 1990

[54] AUTOMATIC QUILTING MACHINE FOR SPECIALIZED QUILTING OF PATTERNS WHICH CAN BE CREATED BY UTILIZING COMPUTER GRAPHICS IN CONJUNCTION WITH A REPROGRAMMABLE COMPUTER

[75] Inventors: David Brower, Tarzana; Thomas K. Jernigan, Canoga Park, both of Calif.

[73] Assignee: TD Quilting Machinery, Burbank, Calif.

[21] Appl. No.: 336,007

[22] Filed: Apr. 10, 1989

[51] Int. Cl.⁵ .............................................. D05B 21/00
[52] U.S. Cl. .............................. 112/262.3; 112/266.1; 112/121.12; 112/119; 112/103
[58] Field of Search .................... 112/121.12, 119, 117, 112/118, 103, 121.11, 262.3, 457, 266.1, 445; 364/470

[56] References Cited

U.S. PATENT DOCUMENTS

| | | | |
|---|---|---|---|
| 3,312,184 | 4/1967 | Cash | 112/118 |
| 3,377,968 | 4/1968 | Story | 112/118 |
| 3,500,777 | 3/1970 | Kalning et al. | 112/118 |
| 3,757,710 | 9/1973 | Landoni | 112/118 |
| 4,188,893 | 2/1980 | Shimazaki | 112/121.11 |
| 4,385,570 | 5/1983 | Yanagi | 112/121.12 |
| 4,403,559 | 9/1983 | Hirose | 112/121.12 |
| 4,498,404 | 2/1985 | Sadeh | 112/121.12 |
| 4,526,116 | 7/1985 | Mannel | 112/266.1 |
| 4,583,181 | 4/1986 | Gerber | 364/470 |
| 4,669,405 | 6/1987 | Resta et al. | 112/103 X |
| 4,674,421 | 6/1987 | Iwase | 112/121.12 |
| 4,748,920 | 6/1988 | Stutznacker | 112/121.12 X |
| 4,849,902 | 7/1989 | Yokoe et al. | 112/121.12 X |

FOREIGN PATENT DOCUMENTS

| | | | |
|---|---|---|---|
| 0148582 | 8/1985 | Japan | 112/121.12 |
| 60-43146 | 9/1985 | Japan | 112/121.12 |

Primary Examiner—Peter Nerbun
Attorney, Agent, or Firm—Thomas I. Rozsa

[57] ABSTRACT

An automatic quilting machine for use in stitching individual selected patterns into a large fabric such as a bedspread or quilt. The bedspread or quilt is stretched on a large metal frame which is mounted on a table which can be moved in the X-direction, the Y-direction, or any X-Y combination direction. The sewing machine head is mounted on a cross beam which is aligned at the approximate center point of the metal frame on which the fabric is stretched. The needle of the sewing machine head can stitch a pattern into any location in the fabric and the metal frame is moved in any direction relative to the fixed sewing machine head in order to bring the desired stitch location on the fabric into alignment with the sewing machine head. The pattern can be created through reading by a scanner which then converts the pattern into machine readable language which is stored in a process controller. Alternatively, the pattern can be hand drawn on a monitor by graphic systems such as a mouse combined with computer aided design programs which provide graphic menus and through which the drawn pattern can be converted into machine readable language which is then stored in the memory of a process controller. The stored pattern can be subsequently stitched into the fabric through commands from the process controller which direct a remote control apparatus to move the table in the desired direction to create the pattern.

51 Claims, 3 Drawing Sheets

Fig. 1.
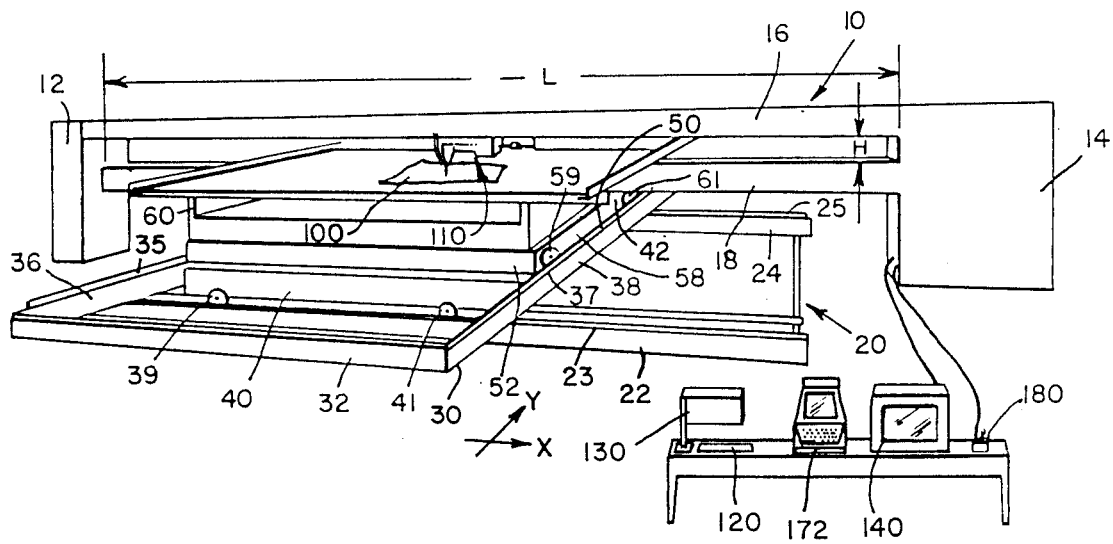
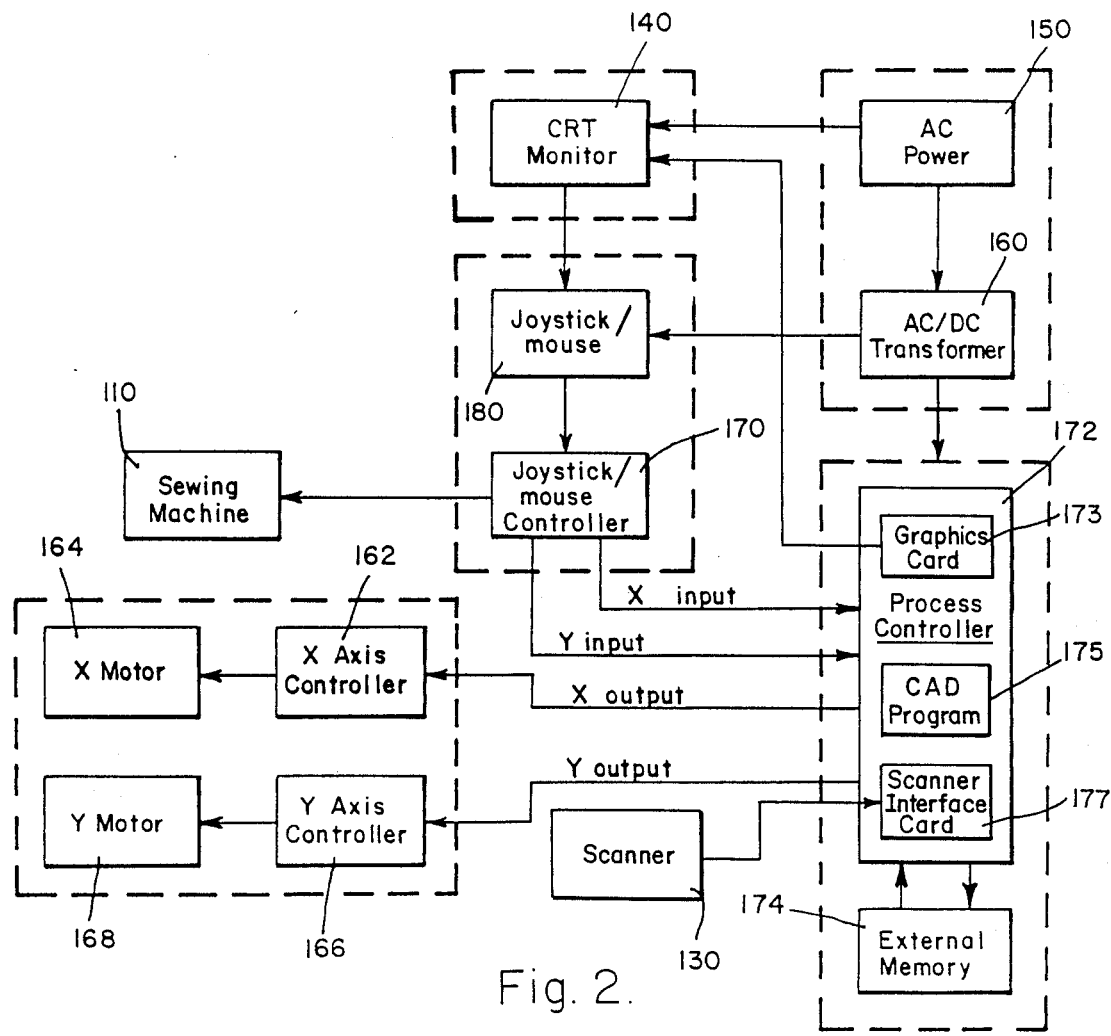
Fig. 2.

AUTOMATIC QUILTING MACHINE FOR SPECIALIZED QUILTING OF PATTERNS WHICH CAN BE CREATED BY UTILIZING COMPUTER GRAPHICS IN CONJUNCTION WITH A REPROGRAMMABLE COMPUTER

BACKGROUND OF THE INVENTION

1. Field of the Invention

The field of the present invention relates to frame quilting machines which are large table-like structures used to sew patterns into large textile items; in particular bedspreads and quilts. The field of the present invention also relates to industrial sewing machine apparatus and processes used to sew patterns and stitching into large fabrics, which sewing operation is not easily performed on conventional sewing machines. The field of the present invention also relates to machines which include a method of duplicating a selected pattern over an entire bedspread or quilt utilizing specialized computer assisted drawing techniques.

2. Description of the Prior Art

Industrial sewing machine operations are known in the prior art. Patterns and stitching into fabrics is commonly performed on industrial sewing machines. The operator hand guides the fabric between the needle and the sewing machine table and the pattern is sewn into the fabric. This process is practical for small pieces of fabric and is commonly done on piece goods such as garments. When handling larger pieces of fabric such as a roll of fabric, a method known in the prior art is roll to roll sewing. The sewing machine head is located along an X-axis and the material is unwound from a roll and caused to move transverse to the sewing machine head such that the fabric moves along a Y-axis. The sewing machine sews a stitch into the large fabric as the head moving along the X-axis and the fabric moving along the Y-axis intersect each other. The fabric is then wound onto a second receiving roll.

When sewing a very large piece of fabric such as a bedspread or quilt, a frame quilting machine is used. The frame quilting machine comprises a large frame, usually made of metal, onto which the fabric to be sewn is spread. Commonly, the pattern is sewn by a sewing machine guided by a computer into which a predetermined pattern has been programmed. The fabric remains stationary on the frame and the sewing machine head moves along the fabric and stitches in the predetermined pattern.

The current method for computer programmable quilting patterns uses a digitizer/cursor board with a method of plotting patterns. It is also used in the design of patterns and is accomplished on a scaled down version of the patterns. Plotting is accomplished using a mouse for indexing points on an XY axis. The points are programmed and followed through use of the computer. The prior art uses standard patterns which are preprogrammed into the computer and selected individualized patterns which are created as the bedspread or quilt is on the machine. The prior art technique is both cumbersome and time consuming. A drawing of the object design to be sewn into the quilt is placed on a surface and a digitizing tablet is placed over the drawing. The pattern is digitized point by point by a crossbar device and the point positions are recorded. At least 20 to 30 such digitized points must be made for even the simplest pattern. The digitized points are then converted into machine language and then put into an E-Prom. The pattern is encoded or "burned" into the E-Prom and the E-Prom chip is physically put into the computer. In addition to the time consuming nature of the task, the required physical handling of the E-Prom leads to the possibility that the chip can be damaged and the process must be started over again. In addition, if a small change is made in the pattern, then entire process must be started over again.

Sewing machines and various frame quilting apparatus and processes have previously been patented. The following is representative of the types of apparatus and processes which have been patented:

1. U.S. Pat. No. 4,188,893 issued to Shimazaki in 1980 for "Device of Detecting Cloth Feeding Amount In Sewing Machines".
2. U.S. Pat. No. 3,377,968 issued to Story in 1968 for "Material Holding And Guide Attachment For Sewing Machine".
3. U.S. Pat. No. 4,429,364 issued to Maruyama et al. in 1984 for "Sewing Machine-Pattern Data Processor".
4. U.S. Pat. No. 1,958,893 issued to Kintner et al. in 1934 for "Photosensitive Apparatus".
5. U.S. Pat. No. 4,583,181 issued to Gerber et al. in 1986 for "Fabric Flow Related System".
6. U.S. Pat. No. 3,500,777 issued to Kalning et al in 1970 for "Quilting Apparatus".
7. U.S. Pat. No. 3,757,710 issued to Landoni in 1973 for "Automatic Quilting Machine".
8. U.S. Pat. No. 3,312,184 issued to Cash in 1967 for "Quilting Machine Of The Endless Guide Track Type".
9. U.S. Pat. No. 4,526,116 issued to Mannel in 1985 for "Method And Arrangement To Control An Automatic Embroidery Machine".
10. U.S. Pat. No. 4,403,559 issued to Hirose in 1983 for "Programming System For A Sewing Machine".
11. U.S. Pat. No. 4,784,071 issued to Sadeh et al. in 1988 for "Automatic Sewing Machine With Scanning Camera System".
12. U.S. Pat. No. 4,669,405 issued to Resta et al in 1987 for "Quilting Machine With Relatively Moving Cloth Holder Carriage And Sewing Head".

U.S. Pat. No. 4,188,893 to Shimazaki discloses an apparatus for test running a pattern by matting the X-Y grid on an oscilloscope in order to test the pattern to be sure that the proper pattern is run before actual cloth is used (and wasted).

U.S. Pat. No. 1,958,893 to Kintner et al. discloses the use of a video camera in conjunction with a missile projecting apparatus. The camera has a photosensitive eye for regulating the activity of the apparatus, wherein the position of the photo-sensitive eye and the projecting device are so related that the missiles are projected in accordance with the position of the target.

U.S. Pat. No. 3,377,968 to Story illustrates a particular type of guiding apparatus for holding material and guiding it relative to the sewing machine.

U.S. Pat. No. 3,500,777 to Kalning et al. illustrates what is now the well known quilting machine with multiple sewing heads.

U.S. Pat. No. 3,312,184 to Cash illustrates a quilting machine which allows independent movement of the quilt holder in any direction. The machine is capable of sewing two or three reproductions of the same sewing line into the same quilt at the same time.

U.S. Pat. No. 4,526,116 to Mannel discloses an automatic quilting machine wherein a video camera is used to pick up certain patterns of a motif carrier and transmit them to the sewing machine. Here, the pattern is automatic from a predetermined pattern.

U.S. Pat. No. 3,757,710 to Landoni discloses an automatic quilting machine where the heads can be changed so that certain patterns of stitching paths can be alternated with one or more types of different patterns.

U.S. Pat. No. 4,429,364 issued to Maruyama involves a computer operated pattern input for a sewing machine.

U.S. Pat. No. 4,583,181 issued to Geber discloses a device to assist an operator in dealing with flaws encountered during the spreading of web material to be cut.

U.S. Pat. No. 4,403,559 issued to Hirosi discloses a sewing machine having a small X-Y movable table to move fabric relative to the sewing machine needle and an electronically controlled movement means.

None of the known prior art apparatus including those disclosed in the above patents enables an operator to individually hand sew an individual pattern into a large piece of fabric such as a bedspread or quilt while remaining at a remote position from the fabric. In present day operations, such hand sewn operations require the operator to physically be above the quilting table, which can be almost 12 feet square, and hand sew the pattern into the fabric. This is a very expensive and time consuming process. The only known apparatus for sewing patterns into the quilt is disclosed in the Mannel patent wherein a video camera is used to pick up certain patterns of a motif carrier and transmit them to the sewing machine. Here, the pattern is automatic from a predetermined pattern. More expensive and finer quilts and bedspreads are those which have individual patterns sewn into them and can be advertised as having "hand sewn" individual patterns. Therefore, there is a significant need for an apparatus and process which enables hand sewn individual patterns to be sewn into large fabrics such as quilts and bedspreads in an efficient manner where the worker or workers do not have to be guided above the large laid out fabric and hand sew the patterns into the fabric.

None of the prior art patents discloses an individualized reprogrammable computer used in conjunction with an individual selected hand sewn pattern wherein the pattern is first hand designed while the quilt and bedspread is on the frame and thereafter the hand designed individualized pattern is programmed into the computer to be repeated.

In addition, in the prior art, the computer controls all functions including the sewing functions of the machine, every stitch in the movement, and the X-Y movement function. This creates an extremely complex operation when it is necessary to reprogram the computer. None of the prior art embodiments selectively breaks down the three functions into individualizied computed program modes so that reprogramming of one element does not require reprogramming the entire system.

In addition, most sketching involves either free hand sketching by the operator or the utilization of a digitizer/cursor board with a method of plotting patterns. None of the prior art devices combine the features of the present invention with a specialized computerized aided design system to substantially reduce the labor and significantly increase the accuracy with which drawings are made for patterns to be stitched onto the fabric such as a quilt.

SUMMARY OF THE PRESENT INVENTION

The present invention relates to an automatic quilting machine for use in stitching individual selected patterns into a large fabric such as a bedspread or quilt. The bedspread or quilt is stretched on a large metal frame which is mounted on a table which can be moved in the X-direction, the Y-direction, or any X-Y combination direction, either through a manually operated automatic joystick or mouse or through an automatic remote control directed by a computer. The sewing machine head is mounted on a cross beam which is aligned at the approximate center point of the metal frame on which the fabric is stretched. The needle of the sewing machine head can stitch a pattern into any location in the fabric and the metal frame is moved in any direction relative to the fixed sewing machine head in order to bring the desired stitch location on the fabric into alignment with the sewing machine head.

In addition, the present invention also relates to a reprogrammable function integrated into the system wherein the operator first manually draws the desired pattern on a monitor using conventional graphic systems apparatus such as a mouse. The tracing function is facilitated through a computer aided design program which automatically converts the drawn pattern into computer language which then can cause the stitch to be reprogrammed at any desired location on the fabric. An example of such a computer aided design program is AutoSketch - R or Autocad -R which are federally registered trademarks of Autodesk, Inc. At the end of this step, the traced pattern is stored into the memory of the computer as a digitalized image of the pattern embodied in the computer aided design program. The computer aided design program then permits the patterns to be duplicated as often as desired after information concerning the dimension of the fabric and the desired locations for the repeated pattern are input into the computer program. At the end of this step, the computer will have generated and stored a digitalized map of the entire area to be quilted. In the third step of the process, the operator will command the start of the automated quilting generated process and the computer will cause the machine to go to the marked locations in the computer which are comparable to the marked locations on the bedspread or quilt and repeat the individualized pattern which was created by the operator. The commands are placed into the remote control operation which causes the movement of the frame quilting table.

Further, the present invention also relates to a system wherein the sewing machine function is controlled by one computer usually located on the sewing machine head and the quilting table motion in the X-direction, Y-direction and X-Y direction is controlled by a separate computer.

In general, this is a frame quilting machine. A bedspread, comforter, quilt, etc. is stretched securely on a metal frame. It is placed on an X-Y positioning table for movement controlled through a sewing machine. The sewing machine has been modified and mounted on a steel frame (two cross beams top and bottom) that can accommodate twelve feet by twelve feet six inches of stitching dimensions. Of course it can be made larger or smaller. The machine has been engineered and built to satisfy increased production needs of manufacturers who supply "custom, hand-guided, or outline quilted". The key elements of the present invention are: (a) sewing and auxiliary functions; (b) the electronic coordination of movement and sewing speeds relative to direction and distance of travel of the remote control apparatus; (c) a reprogrammable computer into which the individualized pattern which can be converted into machine language by the computer aided design program of the computer can be programmed into the computer and after at least one point for each subsequent pattern duplication has been marked into the computer aided design computer program, the individualized pattern can be duplicated in each desired location of the bedspread or quilt through activation of the reprogrammable computer which commands the remote control apparatus to move the quilting table relative to the sewing needle.

It has been discovered, according to the present invention, that if a frame quilting machine can be moved relative to a fixed sewing machine head in the X-direction, the Y-direction or any X-Y combination direction by a remote operating means such as a computer, and the frame quilting machine comprises a metal table or frame on which a bedspread or quilt is stretched such that the surface area of the bedspread or quilt is open and unobstructed, and the metal frame can move relative to and between a pair of cross beams which hold a sewing machine head and plate, then an operator can cause a precise pattern to be programmed into the computer through the use of a computer aided design feature which converts the graphic picture pattern into machine readable language and is stored in the memory of the computer, which in turn through a remote control apparatus can cause the programmed pattern to be precisely stitched into the bedspread or quilt by moving the metal frame or quilting table relative to the fixed cross beams housing the sewing machine components in any desired direction to arrive at any desired location on the bedspread or frame where a stitch or pattern is to be sewn.

It has further been discovered, according to the present invention, that if a frame quilting machine can be moved relative to a fixed sewing machine head in the X-direction, the Y-direction or any X-Y combination direction by a remote operating means such as a computer, and the frame quilting machine comprises a metal table or frame on which a bedspread or quilt is stretched such that the surface area of the bedspread or quilt is open and unobstructed, and the metal frame can move relative to and between a pair of cross beams which hold a sewing machine head and plate, then an operator can cause a precise pattern to be programmed into the computer through the use of a computer aided scanner which automatically duplicates the drawn pattern and converts it into machine readable language and further is combined with a computer aided design feature which converts the graphic picture pattern into machine readable language and is stored in the memory of the computer, which in turn through a remote control apparatus can cause the programmed pattern to be precisely stitched into the bedspread or quilt by moving the metal frame or quilting table relative to the fixed cross beams housing the sewing machine components in any desired direction to arrive at any desired location on the bedspread or frame where a stitch or pattern is to be sewn.

It has also been discovered, according to the present invention, that if the system includes a reprogrammable computer into which the specific design is programmed through a computer aided design program as it is being generated by the operator, the individualized pattern can be subsequently restitched over and over at desired locations through activation of the stitch mode of the computer aided design program into the reprogrammable computer, thereby eliminating the necessity of the operator having to continuously hand guide the pattern at each new location.

It has further been discovered, according to the present invention, that if one computer controls the sewing function of the sewing machine and a second computer controls the movement of the quilting table, then reprogramming either computer is greatly simplified.

It is therefore an object of the present invention to provide an apparatus by which an operator can remain at a remote location from a large frame quilting machine and cause a precise pattern to be sewn into the large bedspread, comforter, quilt, or other fabric which is held on the metal frame or table of the frame quilting machine, through the use of a scanner which can automatically duplicate a graphic pattern into machine readable form. Thereafter, the pattern is stored in the memory of the reprogrammable computer and the pattern can be duplicated into the fabric through commands from the computer which guides a remote control apparatus which causes the frame quilting table to be moved relative to the sewing needle.

It is a further object of the present invention to provide an apparatus by which an operator can remain at a remote location from a large frame quilting machine and cause a precise pattern to be sewn into the large bedspread, comforter, quilt, or other fabric which is held on the metal frame or table of the frame quilting machine, through the use of a computer aided design feature in which the pattern can be drawn on a monitor by movement of a cursor which is guided by a remote movement apparatus such as a joystick or mouse and the drawn pattern can thereafter be automatically converted into machine readable language through use of a computer aided design program such as AutoSketch - R or AutoCad - R, which can automatically duplicate a graphic pattern into machine readable form. Thereafter, the pattern is stored in the memory of the reprogrammable computer and the pattern can be duplicated into the fabric through commands from the computer which guides a remote control apparatus which causes the frame quilting table to be moved relative to the sewing needle.

It is another object of the present invention to provide an apparatus which enables frame quilting for specialized hand selected patterns to be quickly and efficiently performed with a minimum amount of training time of the operator.

It is a further object of the present invention to provide an apparatus which can accommodate computerized pattern quilting of a predetermined computer generated pattern and also accommodate specialized hand selected patterns, or any combination thereof, in the same unit.

It is an additional object of the present invention to increase the rate of production of hand guided patterns sewn into large fabrics such as bedspreads or quilts.

It is an additional object of the present invention to enable a hand selected pattern to be sewn into a large fabric such as a bedspread or comforter while an operator is positioned at a distance remote from the moving parts of the machine such as the frame table and sewing machine needle, to thereby significantly reduce the risk of injury to an operator.

It is an additional object of the present invention to provide a system for automatically duplicating the individualized patterns through a specialized computer aided design program or scanner, to thereby eliminate the necessity of using a digitizer/cursor board to individually record numerous plotted points of the pattern drawing and thereafter burn them into a E-Prom.

It us a further object of the present invention to provide a system wherein the computers which control the sewing machine function and the quilting table movement are segregated to thereby reduce the effort involved in reprogramming the computers.

Further novel features and other objects of the present invention will become apparent from the following detailed descrpition, discussion and appended claims, taken in conjunction with the drawings.

DRAWING SUMMARY

Referring particularly to the drawings for the purpose of illustration only and not limiation, there is illustrated:

FIG. 1 is a perspective view a frame quilting machine, including a monitor, a scanner, and a process controller with computer aided design program.

FIG. 2 is a block diagram of the components of the electronic control components of the present invention automatic quilting machine including pattern duplication through a reprogrammable computer which comprises a computer aided design computer program and a scanner.

DETAILED DESCRIPTION OF THE PREFERRED EMBODIMENT

Figure 3:
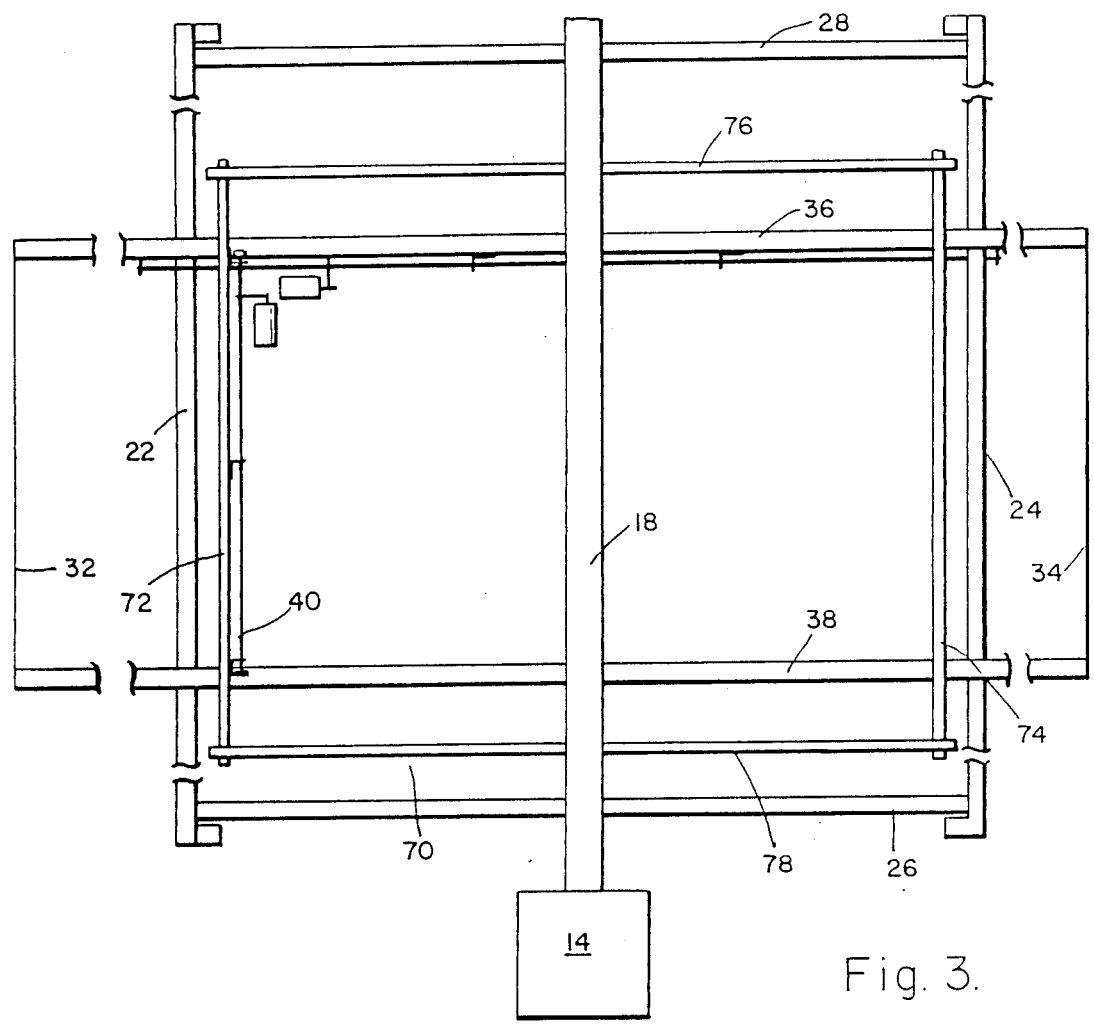
FIG. 3 is a top plan view of the main body of the present invention automatic frame quilting machine including pattern duplication through a reprogrammable computer which comprises a computer aided design computer program and a scanner.

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Referring to FIG. 1, the main structural elements of the present invention automatic frame quilting machine for specialized quilting of patterns including pattern duplication through a reprogrammable computer which comprises a computer aided design computer program and a scanner (hereinafter referred to as "automatic quilting machine") will be discussed first. The entire automatic quilting machine is designated as 10. The main structural member of the automatic quilting machine 10 is a paair of posts of box members, comprising a left box member 12 and a right box member 14. By way of example, the left box member 12 which serves only as a support member can be made of quarter inch plate steel and can have a base which is twenty inches wide by twenty-four inches deep and fifty-two inches tall. The right box member 14 which includes the electronics and motors, as will be described later, in addition ot acting as a support member, can also be made of quarter inch plate steel and can have a base which is forty-four inches wide by twenty-four inches deep and fifty-two inches tall. The two support boxes 12 and 14 support a pair of cross beams; an upper cross beam 16 and a lower cross beam 18. Upper cross beam 16 can be made of quarter inch plate steel and can be twenty-four feet long, four inches wide and eight inches tall. Lower cross beam 18 can be made of quarter inch plate steel and can be twenty-four feet long, eight inches wide and eight inches tall. As illustrated in FIG. 1, the two beams 16 and 18 run parallel to each other between support box members 12 and 14, and are spearated by a gap "H" which by way of example may be nine and a half inches. The cross beams 16 and 18 are permanently attached to the supporting box members 12 and 14 by conventional means such as welding.

Referring to FIGS. 1 and 3, on the ground between the supporting box members 12 and 14 and beneath the lowermost cross beam 18 is the base track 20. The base track 20 is comprised of track supports 22 and 24 which support thereon a gear and rack system which will be described in greater later on. Track support 22 further comprises a track 23 on which a pair of rollers may roll. Track support 24 further comprises a track 25 on which a pair of rollers may roll. The track supports 22 and 24 are aligned parallel to each other and are attached by means of transverse spacing members 26 and 28 which also run aprallel to each other, thereby forming a generally square base which rests on the ground. Resting immediately above the base track 20 is a first movable support member track 30. The first movable support member track 30 is comprised of a pair of parallel X-direction beams 32 and 34 and a pair of Y direction beams 36 and 38 which are connected together to form a generally rectangular frame. The frame comprised of members 32, 34, 36 and 38 of first movable support member 30 support transverse roller members 40 and 42. Transverse roller member 40 is supported between Y direction beams 36 and 38 and is generally parallel to X-direction beams 32 and 34 and is aligned directly over track support 22. Transverse roller member 40 further comprises a pair of rollers 39 and 41. Transverse roller member 42 is supported between Y-direction beams 36 and 38 and is generally parallel to X-direction beams 32 and 34 and is aligned directly over track support 24. Transverse roller member 42 further comprises a pair of rollers (not shown). First movable support track 30 can move in the X direction as the rollers on transverse roller members 40 and 42 can roll on the track 23 contained on track support 22 and on track 25 contained on track support 24 respectively. Y-direction beam 36 further comprises a track 35 and Y-direction beam 38 further comprises a track 37. Y-direction beams 36 and 38 further comprise gear and rack assemblies, as will be described later.

Resting immediately above the first movable support member track 30 is a second movable support member track 50. The second movable support member track 50 is comprised of a pair of parallel X-direction beams, one of which is shown at 52 and a pair of Y direction beams, one of which is shown at 58, which are connected together to form a generally rectangular frame. The Y-direction beams on the second movable support member track 50 each further comprise a pair of rollers which enable the second movable support track 50 to move in the Y-direction. Y-direction beam 58 comprises a pair of rollers 59 and 61 which move on track 37 and Y-direction beam 56 comprises a pair of rollers (not shown) which move on track 35.

Second movable track member 50 further comprises four posts at its corners, two of which, 60 and 62 are shown in FIG. 1. The four posts support quilt table 70 which is comprised of X-direction table beams 72 and 74 and Y-direction table beams 76 and 78, connected together by means such as welding. X-direction table beam 72 is supported on posts 60 and 62 and X direction table beam 74 is supported on the two opposite posts (not shown). Y-direction table beams 76 and 78 are suported on the two X-direction table beams 72 and 74 adjacent their respective ends, as shown in FIGS. 1 and 3. The two X-direction table beams 72 and 74 are parallel to each other and the two Y-direction table beams 76 and 78 are parallel to each other.

As illustrated in FIGS. 1 and 3, the posts on second movable track member 50 support the table beams such that the table beams 76 and 78 pass through gap H between cross beams 16 and 18 and table beams 72 and 74 can pass through the gap H if the Y direction movement is of sufficient length. In operation, a bedspread or quilt 100 is stretched across the table beams 72, 74, 76, and 78, which by way of example can form a table surface of approximately twelve feet in the X-direction by twelve and a half feet in the Y-direction, such that the quilt 100 is supported at its edges by the four table beams 72, 74, 76 and 78 which result in a fully accessible quilt over its entire interior upper and lower surface. The table beams are causes to move in the X-direction by first movable support track 30 as the rollers on transverse roller members 40 and 42 move along tracks 23 and 25 respectively. The length "L" of gap "H" is preferably at least twice the length of the two X-direction table beams 72 and 74. In this way, the entire X-direction area of the quilt table 70 can be reached by the centermost position along the cross beams 16 and 18. The table beams are caused to move in the Y direction by second movable support member track 50 when the rollers on its Y-direction beams move along tracks 35 and 37. The length of tracks 35 and 37 is at least twice the length of the two Y-direction table beams 76 and 78. In this way, the entire Y-direction area of the quilt table 70 can be reached by the centermost position along the cross beams 16 and 18. Through this combination of X and Y movements, the entire area of the quilt table 70 and the quilt 100 spread thereon can be reached by the centermost position of cross beams 16 and 18. In the preferred starting position, the quilt table 70 is centered relative to the cross beams 16 and 18 and can move in any X-Y direction relative the centermost position of the cross beams.

Figure 4:
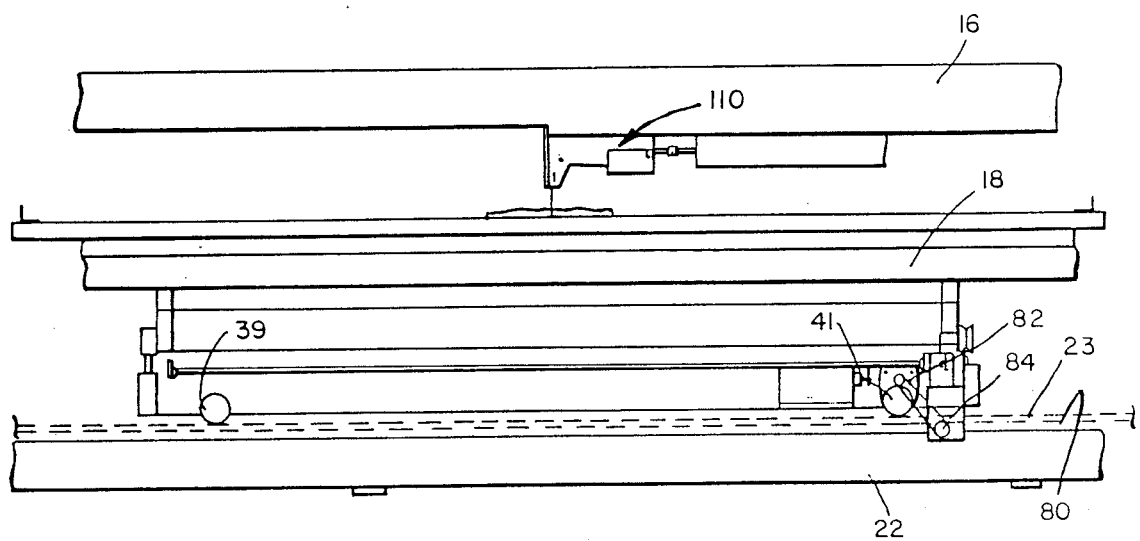
FIG. 4 is a front elevational view of the present invention automatic frame quilting machine including pattern duplication through a reprogrammable computer which comprises a computer aided design computer program and a scanner.

The quilt table 70 can be caused to move in the X and Y directions as previously described by numerous conventional types of means, such as a gear and rack assembly. One such gear and rack assembly is illustrated in FIG. 4. Track support 22 supports track 23 on which rollers 39 and 41 can roll in the X-direction. Track support 22 further contains on its interior surface a rack assembly 80 having a conventional multiplicity of teeth which can accommodate a gear. Transverse roller member 40 further supports a rotatable gear 82 which is caused to rotate by a conventional gear drive mechanism 84 having smaller gears driven by a belt to drive the rotatable gear 82. The gear drive mechanism is driven by a conventional linkage hookup to a drive motor which causes a motor shaft to rotate and thereby drive the gear drive mechanism 84 which in turn causes the rotatable gear 82 to rotate. When the rotatable gear rotates in the clockwise direction, the rotatable gear moves along the rack assembly 80 and causes the transverse roller member 40 (and opposite transverse roller member 42) to move to the right in the X-direction. When the rotatable gear rotates in the counterclockwise direction, the rotatable gear moves along the rack assembly 80 and causes the transverse roller member 40 (and opposite transverse roller member 42) to move to the left in the X-direction. It will be appreciated that a comparable rack and gear assembly is supported on Y-direction beam 38 and Y-direction beam 58, thereby enabling Y-direction beams 58 (and the opposite Y-direction beam on second movable support member track 50) to move back and forth in the Y-direction.

It will be appreciated that conventional adjustment modifications can be incorporated into this system. For example the overall height of the quilt table 70 can be adjusted up and down by creating slidable adjustments in the posts (60, 62 and to two opposite posts) in order to adjust the height of quilting table 70 relative to the cross beams 16 and 18.

Figure 5:
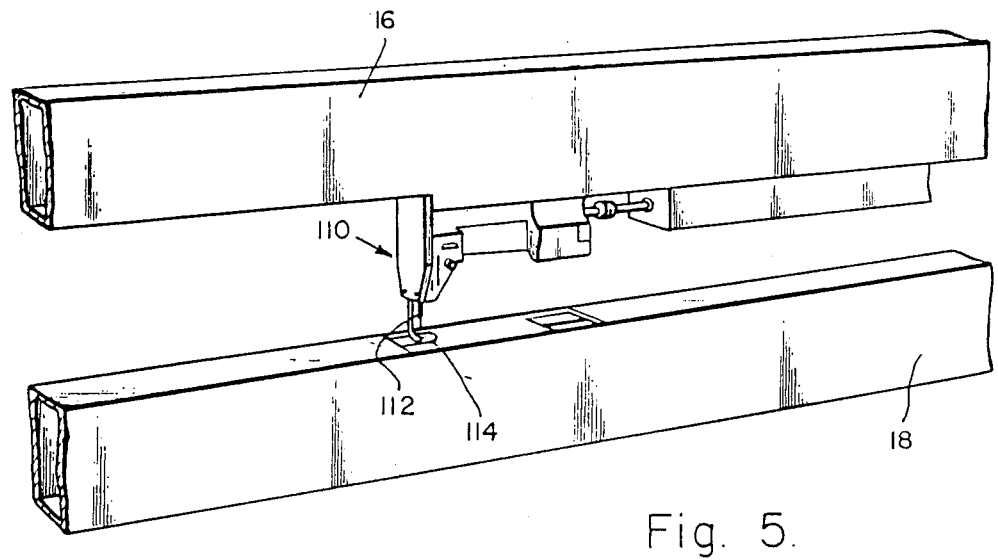
FIG. 5 is an enlarged perspective view of the front portion of the main support beam and attachments thereto.
Figure 6:
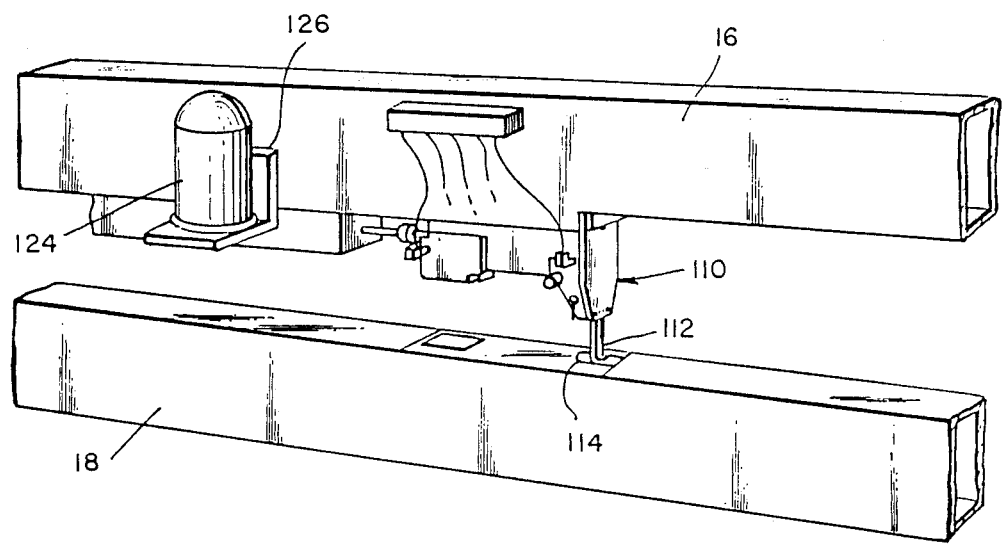
FIG. 6 is an enlarged perspective view of the rear portion of the main support beam and attachments thereto.

Referring to FIGS. 4, 5, and 6, a sewing machine head 110 is bolted stationary to upper cross beam 16. Any industrial machine sewing head which is suitable for the intended sewing purpose can be incorporated with the present invention. However, to achieve the goal of the present invention in segregating the computer controlling the sewing functions from the computer controlling the quilting table movement, it is preferred that a sewing machine head having its own computer be used. By way of example, one type of sewing machine head which can be used with the present invention is the Mitsubishi Industrial Sewing Machine Model LS2-180 high speed, single needle lockstitch sewing machine. A microprocessor connected to this type of sewing machine head provides many auxiliary functions such as control of needle position, presser foot lift, undertrim, and tension release disk. The sewing machine head 110 is attached to the underside of upper cross beam 16 such that the sewing needle 112 is at the approximate center of cross-beam 16. In this manner, the sewing needle 112 can reach any portion of the quilt table 70 and quilt 100 thereon by the X-Y movement of the quilt table, as previously discussed. The sewing machine plate 114 is formed into the top of lower cross beam 18 such that the plate 114 is aligned with the needle 112, as best illustrated in FIG. 6.

A bobbin 124 is supported by a frame member 126 attached to one edge of upper cross beam 16. Thread 128 is wound on the bobbin 118 and is guided by conventional means through the sewing machine head 110 and to the needle 112.

While it would be possible to physically move the quilting table 70 as the needle is sewing the pattern, it is not practical since the table is heavy and could not be moved fast enough by hand to quickly guide the portion of quilt 100 to the area where the sewing needle 112 is sewing the next stitch. Therefore, an automatic electrical system for moving the quilting table 70 and quilt 100 thereon into position for appropriate sewing of the pattern is required. A block diagram of the electronics for performing this operation is presented in FIG. 2. A source of alternating current power 150 energizes the entire system. In one connection, the source of alternating current power 150 is connected to a monitor 140. In a second connection, the alternating current source is connected to an alternating current to direct current transformer 160. The transformer 160 is in turn connected to a process controller or computer 172 which provides control functions for movement of the quilting table beams in the X-direction, the Y-direction, and therefore the X-Y direction for subsequent duplication of the pattern as will be discussed hereafter. The AC to DC transformer 160 is also connected to a remote control apparatus such as a joystick or mouse 180 which in turn is connected to a control 170. The controller 170 has an X-axis input and a Y-axis input into the process controller or computer 172. The controller 170 is in turn also connected to the sewing machine 110. The process controller 172 has an X-direction output which in turn is connected to an X-axis controller 162 which in turn is connected to the X direction motor 164 which is a direct current motor. The process controller 172 also has a Y-direction output which in turn is connected to a Y-axis controller 166 which in turn is connected to the Y direction motor 168 is which a direct current motor. In the block diagram on FIG. 2, the process controller 172 is also shown connected to an external memory 174. It is also within the spirit and scope of the present invention for the process controller to have an internal memory. Included within the process controller 172 is a graphics card 173 through which the process controller 172 is connected to the monitor 140. The process controller 172 also is programmed through floppy disks or a hard disk with a computer aided design ("CAD") program 175. Also shown is a scanner 130 which is connected to the process controller 172 through a scanner interface card 177.

The remote control apparatus 180 is a bi-directional joystick or mouse with a variable speed range to permit the operator to make high-speed may be set to a maximum diagonal speed of approximately twenty-five feet per minute. Limit switches may be included to prevent the table's overtravel. The remote control apparatus 180 through the controller 170 can also be used to control the speed of the sewing needle 112. The DC motors 164 and 168 may be variable speed motors which are coupled to the quilt table through conventional drive belts, gears and racks, as previously described. The mechanical portion of the drive system can be suitable for adaptation to a computer controlled servo system and can therefore be controlled by the process controller 172. The electronic control components including the AC to DC transformer 160, the X-axis controller 162, the Y-axis controller 166, the X-direction motor 164, the Y-direction motor 168 and the controller 170 can all be housed in the larger supporting box member 14. In the illustration of FIG. 1, the process controller 172 is shown adjacent the monitor 140. It is also possible to house the process controller 172 and its external memory 174 within larger supporting box member 14.

An improvement in the present invention is the combination of a computer aided design system for creating the pattern which will be sewn by the frame quilting machine. The individual can select a pattern which is to be sewn into the machine. The pattern can be hand drawn onto the monitor 140 through use of a cursor moving apparatus such as a mouse 180. The cursor moving apparatus 182 can hand draw the pattern onto the monitor 140 and the individual can make any number of modifications and selections so that a hand designed pattern can be completely drawn on the monitor 140. After the hand drawn pattern has been drawn onto the monitor 140, the operator feeds the drawing data into the computer aided design program 175 which automatically converts the drawn graphic image into machine readable form. In the event modifications are required, the graphic pattern can be called up on the monitor 140 and the required changes made by movement of the cursor through the mouse 170 until the modified pattern has been achieved. Then the pattern is once again fed through the computer aided design program 175 and converted into machine readable form. In addition, the operator can select a grid on the monitor 140 and program a point from the graphic pattern at each location on the grid where the pattern is to be duplicated. This information can also be fed into the computer aided design program and stored. Therefore, the process controller can automatically direct the frame quilting table to move in the desired X, Y, or X-Y direction to automatically sew the programmed pattern into the fabric 100 and to cause the pattern to be duplicated on the points as marked on the computer monitor grid. Commands are fed from the process controller 172 through the X-axis output to the X-axis controller 162 to the X motor 164, and from the process controller 172 through the Y-axis output to the Y-axis controller 166 to the Y motor 168. Therefore, the present invention combines frame quilting with a computer aided design program (which by way of example can be an AutoSketch-R or an AutoCad-R program) so that individualized patterns can be hand drawn on the computer monitor and automatically converted into machine readable language from which the process controller can automatically sew the pattern into the fabric (such as a quilt or bedspread) and further duplicate the pattern at any multiplicity of desired locations.

By way of example the computer aided design program 175 can be the AutoSketch-R program. The AutoSketch R program is a full-function computer-aided design package for generating line art. The drawing is created using a mouse and menus which have therein various shapes such as lines, arcs, circles, points, polygons and spline curves (spline curves are curves fitted to a frame of control points which have been specified). After the drawing has been made, the drawing can be duplicated at any desired location and in any manner. The drawings can be enlarged to add fine points or otherwise modified to suit the final desired pattern.

An alternative method which can be used with the present invention involves the combination of a vision scanner 130 which can read a graphic pattern from a surface such as a sheet of paper 120 and convert the graphic pattern into machine readable form in the process controller 172. In this case, the pattern to be sewn into the fabric 100 has already been produced on a surface such as a sheet of paper and therefore it is not necessary to go to the effort of redrawing the entire pattern by hand. Instead, the drawn pattern 120 is placed in the scanner 130 which reads the patterns and converts it into machine readable language which is into the process controller 172 through scanner interface card 177. Thereafter, the pattern can be sewn into the quilt through commands from the process controller, as previously described. For duplication, the machine encoded pattern can be plotted on a grid on the monitor, where the grid depicted on monitor 140 conforms to the fabric 100. A selected point from the pattern is thereafter plotted on the grid at each location where the pattern is to be duplicated into the fabric. The use of the computer aided design program such as Autosketch-R facilitates selecting the desired point from the machine encoded pattern which point is plotted on the monitor grid for subsequent duplication into the fabric. The computer aided design program 175 further permits the scanned pattern to be presented on the monitor and thereafter modifications to the scanned machine encoded pattern can be made through the movement of a cursor guided by a mouse to alter certain design features of the pattern as may be desired. Thereafter, the scanned-modified graphic pattern can be converted into machine readable language through the computer aided design program and stored in the memory of the process controller 172. Regardless of whether the pattern used is simply one which can be scanned by the scanner 130 and converted into machine language or whether the scanned pattern has been modified through the computer aided design program 175, and thereafter mapped for subsequent duplication, the machine readable pattern can then be sewn into the fabric such as a quilt or bedspread. Thereafter, the process controller can automatically direct the frame quilting table to move in the desired X, Y, or X-Y direction to automatically sew the programmed pattern into the fabric 100 and to cause the pattern to be duplicated on the points as marked on the computer monitor grid. Commands are fed from the process controller 172 through the X-axis output to the X-axis controller 162 to the X motor 164, and from the process controller 172 through the Y-axis output to the Y-axis controller 166 to the Y motor 168. Therefore, the present invention combines frame quilting with a graphic scanner which in turn can be combined with a computer aided design program (which by way of example can be AutoSketch -R or an AutoCad-R program) so that predesigned patterns can be quickly machine encoded into the process control for subsequent duplication onto the fabric and predesigned patterns can thereafter be individualized through modifications to the pattern hand drawn on the computer monitor and automatically converted into machine readable language from which the process controller can automatically sew the pattern into the fabric (such as a quilt or bedspread) and further duplicate the pattern at any multiplicity of desired locations.

An important design element of the present system is that the process controller 172 which controls the X-Y movement of the quilting table and the trace pattern which is stored in the computer's memory as a computer aided design pattern and/or a scanner input pattern is separate from the computer on the sewing head 110 which controls the sewing needle stitch and speeds. This is accomplished by using a sewing head which has its own independent computer such as a Mitsubishi Industrial Sewing Machine Model LS2-180 high speed, single needle lockstitch sewing machine. In this way, if it is necessary to add new stitch patterns into memory, it is a much simpler task to add the new stitch and program commands to the process controller 172 without also having to reprogram the stitching and other needle functions on the sewing machine head.

Because of the independent computer capability of the machine with one computer controlling the X-Y movement and a second computer on the sewing machine controlling the sewing and stitching functions, the operator can trace a straight line pattern into the X-Y process controller 172 and a software program command to the X-Y process controller 172 will enable the pattern to be automatically modified into a zig-zag or any other desired pattern. This is a valuable modification which cannot be easily achieved with prior art systems where the computer for the sewing machine and X-Y movement is integrated into one large computer. The software program for such prior art systems is too complicated. In such prior art systems, each stitch and each movement for each stitch would need to be programmed. In the prior art you have for example 5 stitches per inch and 4,000 linear inches per fabric so 20,000 stitches and movements per stitch must be programmed. With the present invention, only the table movement needs to be programmed because the stitch pattern is a separate independent program controlled by a separate computer on the sewing machine.

Through use of the present invention, the rate of production is at least three to five times greater than that of hand-guided skilled operators. The training time required to teach the operator to use the present system is only one week, as opposed to four to six months for a conventional system. The present system can even be used by a non-skilled operator instead of the high-skilled operators required to operate present day systems. The risk of injury to the operator is significantly reduced since the operator is positioned at a remote location from the sewing needle and the moving table and therefore does not come in contact or near contact with moving parts.

Defined broadly, the present invention is the method of repetitively sewing a pattern into a fabric having a large surface comprising: (a) positioning a sewing machine head having a source of thread and a sewing needle relative to said fabric; (b) retaining said fabric on a movable structure which can be made to move in a horizontal direction relative to the sewing needle and which can cause a portion of the surface of the fabric to be reached by the sewing needle so that thread can be sewn into the fabric; (c) controlling the movement of the movable structure relative to the sewing needle by a remote control apparatus which is connected to a process controller; (d) creating a pattern on a monitor through use of a cursor and cursor movement apparatus combined with a computer aided design program which converts the pattern into machine readable language; (e) storing the machine readable pattern in the memory of said process controller; and (f) mapping the completed pattern on a computer grid to select where the pattern is to be duplicated on said fabric; (g) whereby the process controller through commands to the remote control apparatus can cause the movement of the movable structure relative to the sewing needle to thereby duplicate the pattern stored in its memory at any multiplicity of desired locations.

The present invention is also the method of repetitively sewing a pattern into a fabric having a large surface comprising: (a) positioning a sewing machine head having a source of thread and a sewing needle relative to said fabric; (b) retaining said fabric on a movable structure which can be made to move in a horizontal direction relative to the sewing needle and which can cause a portion of the surface of the fabric to be reached by the sewing needle so that thread can be sewn into the fabric; (c) controlling the movement of the movable structure relative to the sewing needle by a remote control apparatus which is connected to a process controller; (d) duplicating a predrawn pattern by causing it to be read by a scanner which then converts the pattern into machine readable language; (e) storing the machine readable pattern in the memory of said process controller; and (f) mapping the completed pattern on a computer grid to select where the pattern is to be duplicated on said fabric; (g) whereby the process controller through commands to the remote control apparatus can cause the movement of the movable structure relative to the sewing needle to thereby duplicate the pattern stored in its memory at any multiplicity of desired locations.

Defined more broadly, the present invention is a frame quilting machine comprising: (a) a frame member for retaining a fabric; (b) said frame member mounted on a structure which can be moved in the X-direction, the Y-direction, or any X-Y combination direction; (c) a first cross beam extending horizontally over said frame member; (d) a second cross beam aligned parallel to said first cross beam and extending horizontally beneath said frame member; (e) a first motor to generate movement of said frame member in the X-direction; (f) an X axis controller connected to said first motor; (g) a second motor to generate movement of said frame member in the Y-direction; (h) a Y axis controller connected to said second motor; (i) a remote control apparatus for controlling the movement of said structure and said frame member to enable the frame member and the fabric retained thereon to be moved horizontally in the X-direction, the Y-direction, and any combination X-Y direction between said first cross beam and said second cross beam; (j) a monitor; (k) a sewing machine head attached to said first cross beam and having a source of thread; (l) a sewing needle extending from said sewing machine head and positioned to sew threads into said fabric while the frame member and structure move underneath said first cross beam and above said second cross beam; (m) a sewing machine plate attached to said second cross beam and aligned with said sewing machine head and sewing needle; (n) a process controller having an X input and a Y input connected to said remote control apparatus, the process controller also connected to said X axis controller through an X input and to said Y axis controller through a Y input; (o) said monitor, remote control apparatus, and said process controller connected to a source of power; (p) said process controller further comprising a graphics card to enable commands from the process controller to be viewed on said monitor; (q) a graphic movement apparatus which enables a graphic cursor to draw patterns on said monitor; (r) said process controller further comprising a memory to store machine readable patterns; and (s) said process controller programmed with a computer aided design program which comprises menus of selected shapes which can be viewed on said monitor and used to sketch all or a portion of a desired pattern to be sewn into said fabric; (t) whereby an operator may draw a pattern on said monitor through use of the graphic movement apparatus combined with the computer aided design program, convert the pattern into machine readable language through the computer aided design program, store the pattern in machine readable language in the memory of the computer and cause the pattern to be duplicated on the fabric through commands from the process controller to the remote control apparatus which causes said frame member to move relative to said first and second cross-bream to thereby bring locations on the fabric into alignment with said sewing needle as the pattern is sewn into said fabric.

Said computer aided design program cab be an AutoSketch-R program of an AutoCad-R program.

In the preferred embodiment, said source of power is an alternating current source which is connected to an alternating current direct current transformer before connection to said remote control apparatus and to said process controller.

In the preferred embodiment, said remote control apparatus is a joystick and a joystick controller, wherein the joystick is connected to the source of power and is also connected to the joystick controller which in turn is connected to the process controller through the X input and Y input of the process controller.

Said graphic movement apparatus can be a mouse.

The present invention may be even more broadly defined as an apparatus for sewing thread into fabric comprising: (a) a first structure supporting a sewing machine head having a sewing needle and a source of thread; (b) a second structure supporting the fabric in a postion relative to said sewing needle so that thread may be sewn into the fabric; (c) said second structure capable of horizontal movement in the X-direction, the Y-direction, or any combination X-Y direction relative to said sewing needle; (d) means for generating the horizontal movement of said second structure in the X-direction, the Y-direction, or any combination X-Y direction; (e) a remote control apparatus for moving said second structure and the fabric retained thereon relative to said sewing needle so that said sewing needle may sew a pattern with said thread into said fabric; (f) a monitor; (g) a source of power connected to said monitor, to said remote control apparatus and also connected to said process controller; (h) a process controller having an X input and a Y input connected to said remote control apparatus, the process controller also connected to said means for generating horizontal movement of the second structure; (i) said process controller further comprising a graphics card to enable commands from the process controller to be viewed on said monitor; (j) a graphic movement apparatus which enables a graphic cursor to draw patterns on said monitor; (k) said process controller further comprising a memory to store machine readable patterns; and (1) said process controller programmed with a computer aided design program which comprises menus of selected shapes which can be viewed on said monitor and used to sketch all or a portion of a desired pattern to be sewn into said fabric; (m) whereby an operator may draw a pattern on said monitor through use of the graphic movement apparatus combined with the computer aided design program, convert the pattern into machine readable language through the computer aided design program, store the pattern in machine readable language in the memory of the computer and cause the pattern to be duplicated on the fabric through commands from the process controller to the remote control apparatus which causes said second structure to move relative to said first structure to thereby bring locations on the fabric into alignment with said sewing needle as the pattern is sewn into said fabric.

Another broad definition of the present invention is an apparatus for sewing thread into fabric comprising:

(a) a first structure supporting a sewing machine head having a sewing needle and a source of thread; (b) a second structure supporting the fabric in a position relative to said sewing needle so that thread may be sewn into the fabric; (c) said second structure capable of horizontal movement in the X-direction, the Y-direction, or any combination X-Y direction relative to said sewing needle; (d) means for generating the horizontal movement of said second structure in the X-direction, the Y-direction, or any combination X-Y direction; (e) a remote control apparatus for moving said second structure and the fabric retained thereon relative to said sewing needle so that said sewing needle may sew a pattern with said thread into said fabric; (f) a scanner; (g) a source of power connected to said remote control apparatus and also connected to said process controller; (h) a process controller having an X input and a Y input connected to said remote control apparatus, the process controller also connected to said means for generating horizontal movement of the second structure; (i) said process controller further comprising a memory to store machine readable patterns; and (j) said process controller further comprising a scanner interface card; (k) whereby a predrawn pattern can be read by said scanner which automatically converts the pattern into machine readable language, the pattern is stored in the memory of the process controller and the pattern is duplicated on the fabric through commands from the process controller to the remote control apparatus which causes said second structure to move relative to said first structure to thereby bring locations on the fabric into alignment with said sewing needle as the pattern is sewn into said fabric.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A frame quilting machine comprising:
   a. a frame member for retaining a fabric;
   b. said frame member mounted on a structure which can be moved in the X-direction, the Y-direction, or any X-Y combination direction;
   c. a first cross beam extending horizontally over said frame member;
   d. a second cross beam aligned parallel to said first cross beam and extending horizontally beneath said frame member;
   e. a first motor to generate movement of said frame member in the X-direction;
   f. an X axis controller connected to said first motor;
   g. a second motor to generate movement of said frame member in the Y-direction;
   h. a Y axis controller connected to said second motor;
   i. a remote control apparatus for controlling the movement of said structure and said frame member to enable the frame member and the fabric retained thereon to be moved horizontally in the X-direction, the Y-direction, and any combination X-Y direction between said first cross beam and said second cross beam;
   j. a monitor;
   k. a sewing machine head attached to said first cross beam and having a source of thread;
   l. a sewing needle extending from said sewing machine head and positioned to sew threads into said fabric while the frame member and structure move underneath said first cross beam and above said second cross beam;
   m. a sewing machine plate attached to said second cross beam and aligned with said sewing machine head and sewing needle;
   n. a process controller having an X input and a Y input connected to said remote control apparatus, the process controller also connected to said X axis controller through an X input and to said Y axis controller through a Y input;
   o. said monitor, remote control apparatus, and said process controller connected to a source of power;
   p. said process controller further comprising a graphics card to enable commands from the process controller to be viewed on said monitor;
   q. a graphic movement apparatus which enables a graphic cursor to draw patterns on said monitor;
   r. said process controller further comprising a memory to store machine readable patterns; and
   s. said process controller programmed with a computer aided design program which comprises menus of selected shapes which can be viewed on said monitor and used to sketch all or a portion of a desired pattern to be sewn into said fabric;
   t. whereby an operator may draw a pattern on said monitor through use of the graphic movement apparatus combined with the computer aided design program, convert the pattern into machine readable language through the computer aided design program, store the pattern in machine readable language in the memory of the computer and cause the pattern to be duplicated on the fabric through commands from the process controller to the remote control apparatus which causes said frame member to move relative to said first and second cross-beam to thereby bring locations on the fabric into alignment with said sewing needle as the pattern is sewn into said fabric.

2. An apparatus in accordance with claim 1 wherein said computer aided design program is an AutoSketch - R program.

3. An apparatus in accordance with claim 1 wherein said computer aided design program is an AutoCad - R program.

4. An apparatus in accordance with claim 1 wherein said source of power is an alternating current source which is connected to an alternating current to direct current transformer before connection to said remote control apparatus and to said process controller.

5. An apparatus in accordance with claim 1 wherein said remote control apparatus is a joystick and a joystick controller, wherein the joystick is connected to the source of power and is also connected to the joystick controller which in turn is connected to the process controller through the X input and Y input of the process controller.

6. An apparatus in accordance with claim 1 wherein said fabric is a bedspread.

7. An apparatus in accordance with claim 1 wherein said fabric is a quilt.

8. An apparatus in accordance with claim 1 wherein said sewing machine head and said frame member are aligned such that said sewing needle is at the approximate center point of said fabric and said frame member can move relative to said sewing machine head and said sewing needle so as to permit the sewing needle to reach any portion of the surface area of the fabric.

9. An apparatus in accordance with claim 1 wherein said graphic movement apparatus is a mouse.

10. An apparatus in accordance with claim 1 wherein the speed of said sewing needle is controlled by said remote control apparatus.

11. An apparatus in accordance with claim 1 wherein said sewing machine head is equipped with a computer to control the sewing and stitching functions.

12. An apparatus in accordance with claim 11 wherein an operator can trace a straight-line pattern into the process controller and a software program in the process controller combined with the computer on the sewing machine head will enable the pattern to be automatically modified into a zig-zag or any other desired pattern.

13. A frame quilting machine comprising:
 a. a frame member for retaining a fabric;
 b. said frame member mounted on a structure which can be moved in the X-direction, the Y-direction, or any X-Y combination direction;
 c. a first cross beam extending horizontally over said frame member;
 d. a second cross beam aligned parallel to said first cross beam and extending horizontally beneath said frame member;
 e. a first motor to generate movement of said frame member in the X-direction;
 f. an X axis controller connected to said first motor;
 g. a second motor to generate movement of said frame member in the Y-direction;
 h. a Y axis controller connected to said second motor;
 i. a remote control apparatus for controlling the movement of said structure and said frame member to enable the frame member and the fabric retained thereon to be moved horizontally in the X-direction, the Y-direction, and any combination X-Y direction between said first cross beam and said second cross beam;
 j. a scanner;
 k. a sewing machine head attached to said first cross beam and having a source of thread;
 l. a sewing needle extending from said sewing machine head and positioned to sew threads into said fabric while the frame member and structure move underneath said first cross beam and above said second cross beam;
 m. a sewing machine plate attached to said second cross beam and aligned with said sewing machine head and sewing needle;
 n. a process controller having an X input and a Y input connected to said remote control apparatus, the process controller also connected to said X axis controller through an X input and to said Y axis controller through a Y input;
 o. said remote control apparatus and said process controller connected to a source of power;
 p. said process controller further comprising a memory to store machine readable patterns; and
 s. said process controller further comprising a scanner interface card;
 t. whereby a predrawn pattern can be read by said scanner which automatically converts the pattern into machine readable language, the pattern is stored in the memory of the process controller and the pattern is be duplicated on the fabric through commands from the process controller to the remote control apparatus which causes said frame member to move relative to said first and second cross-beam to thereby bring locations on the fabric into alignment with said sewing needle as the pattern is sewn into said fabric.

14. An apparatus in accordance with claim 13 wherein said fabric is a bedspread.

15. An apparatus in accordance with claim 13 wherein said fabric is a quilt.

16. An apparatus in accordance with claim 13 wherein said sewing machine head and said frame member are aligned such that said sewing needle is at the approximate center point of said fabric and said frame member can move relative to said sewing machine head and said sewing needle so as to permit the sewing needle to reach any portion of the surface area of the fabric.

17. An apparatus in accordance with claim 13 wherein the speed of said sewing needle is controlled by said remote control apparatus.

18. An apparatus in accordance with claim 13 wherein said sewing machine head is equipped with a computer to control the sewing and stitching functions.

19. An apparatus in accordance with claim 18 wherein an operator can trace a straight-line pattern into the process controller and a software program in the process controller combined with the computer on the sewing machine head will enable the pattern to be automatically modified into a zig-zag or any other desired pattern.

20. A frame quilting machine comprising:
 a. a frame member for retaining a fabric;
 b. said frame member mounted on a structure which can be moved in the X-direction, the Y-direction, or any X-Y combination direction;
 c. a first cross beam extending horizontally over said frame member;
 d. a second cross beam aligned parallel to said first cross beam and extending horizontally beneath said frame member;
 e. a first motor to generate movement of said frame member in the X-direction;
 f. an X axis controller connected to said first motor;
 g. a second motor to generate movement of said frame member in the Y-direction;
 h. a Y axis controller connected to said second motor;
 i. a monitor;
 j. a sewing machine head attached to said first cross beam and having a source of thread;
 k. a sewing needle extending from said sewing machine head and positioned to sew threads into said fabric while the frame member and structure move underneath said first cross beam and above said second cross beam;
 l. a sewing machine plate attached to said second cross beam and aligned with said sewing machine head and sewing needle;

m. a process controller connected to said X axis controller through an X input and to said Y axis controller through a Y input;

n. said monitor and said process controller connected to a source of power;

o. said process controller further comprising a graphics card to enable commands from the process controller to be viewed on said monitor;

p. a graphic movement apparatus which enables a graphic cursor to draw patterns on said monitor;

q. said process controller further comprising a memory to store machine readable patterns; and r. said process controller programmed with a computer aided design program which comprises menus of selected shapes which can be viewed on said monitor and used to sketch all or a portion of a desired pattern to be sewn into said fabric;

s. whereby an operator may draw a pattern on said monitor through use of the graphic movement apparatus combined with the computer aided design program, convert the pattern into machine readable language through the computer aided design program, store the pattern in machine readable language in the memory of the computer and cause the pattern to be duplicated on the fabric through commands from the process controller which causes said frame member to move relative to said first and second cross-beam to thereby bring locations on the fabric into alignment with said sewing needle as the pattern is sewn into said fabric.

21. An apparatus in accordance with claim 20 wherein said computer aided design program is an AutoSketch - R program.

22. An apparatus in accordance with claim 20 wherein said computer aided design program is an AutoCad - R program.

23. An apparatus in accordance with claim 20 wherein said source of power is an alternating current source which is connected to an alternating current to direct current transformer before connection to said process controller.

24. An apparatus in accordance with claim 20 wherein said fabric is a bedspread.

25. An apparatus in accordance with claim 20 wherein said fabric is a quilt.

26. An apparatus in accordance with claim 20 wherein said sewing machine head and said second structure are aligned such that said sewing needle is at the approximate center point of said fabric and said second structure can move relative to said sewing machine head and said sewing needle so as to permit the sewing needle to reach any portion of the surface area of the fabric.

27. An apparatus in accordance with claim 20 wherein said graphic movement apparatus is a mouse.

28. An apparatus in accordance with claim 20 wherein said sewing machine head is equipped with a computer to control the sewing and stitching functions.

29. An apparatus in accordance with claim 28 wherein an operator can trace a straight-line pattern into the process controller and a software program in the process controller combined with the computer on the sewing machine head will enable the pattern to be automatically modified into a zig-zag or any other desired pattern.

30. An apparatus for sewing thread into fabric comprising:

a. a first structure supporting a sewing machine head having a sewing needle and a source of thread;

b. a second structure supporting the fabric in a position relative to said sewing needle so that thread may be sewn into the fabric;

c. said second structure capable of horizontal movement in the X-direction, the Y-direction, or any combination X-Y direction relative to said sewing needle;

d. means for generating the horizontal movement of said second structure in the X-direction, the Y-direction, or any combination X-Y direction;

e. a monitor;

f. a process controller having an X input and a Y input connected to said means for generating horizontal movement of the second structure;

g. a source of power connected to said monitor and to said process controller;

h. said process controller further comprising a graphics card to enable commands from the process controller to be viewed on said monitor;

i. a graphic movement apparatus which enables a graphic cursor to draw patterns on said monitor;

j. said process controller further comprising a memory to store machine readable patterns; and k. said process controller programmed with a computer aided design program which comprises menus of selected shapes which can be viewed on said monitor and used to sketch all or a portion of a desired pattern to be sewn into said fabric;

l. whereby an operator may draw a pattern on said monitor through use of the graphic movement apparatus combined with the computer aided design program, convert the pattern into machine readable language through the computer aided design program, store the pattern in machine readable language in the memory of the computer and cause the pattern to be duplicated on the fabric through commands from the process controller which causes said second structure to move relative to said first structure to thereby bring locations on the fabric into alignment with said sewing needle as the pattern is sewn into said fabric.

31. An apparatus in accordance with claim 30 wherein said computer aided design program is an AutoSketch - R program.

32. An apparatus in accordance with claim 30 wherein said computer aided design program is an AutoCad - R program.

33. An apparatus in accordance with claim 30 wherein said means for generating horizontal movement of the second structure further comprises:

a. a first motor to generate movement of said frame member in the X-direction;

b. an X axis controller connected to said first motor and also connected to an X input in said process controller;

c. a second motor to generate movement of said frame member in the Y-direction; and d. a Y axis controller connected to said second motor and also connected to a Y input in said process controller.

34. An apparatus in accordance with claim 30 wherein said source of power is an alternating current source which is connected to an alternating current to direct current transformer before connection to said process controller.

35. An apparatus in accordance with claim 30 wherein said fabric is a bedspread.

36. An apparatus in accordance with claim 30 wherein said fabric is a quilt.

37. An apparatus in accordance with claim 30 wherein said sewing machine head and said second structure are aligned such that said sewing needle is at the approximate center point of said fabric and said second structure can move relative to said sewing machine head and said sewing needle so as to permit the sewing needle to reach any portion of the surface area of the fabric.

38. An apparatus in accordance with claim 30 wherein said sewing machine head is equipped with a computer to control the sewing and stitching functions.

39. An apparatus in accordance with claim 38 wherein an operator can trace a straight-line pattern into the process controller and a software program in the process controller combined with the computer on the sewing machine head will enable the pattern to be automatically modified into a zig-zag or any other desired pattern.

40. A frame quilting machine comprising:
 a. a frame member for retaining a fabric;
 b. said frame member mounted on a structure which can be moved in the X-direction, the Y-direction, or any X-Y combination direction;
 c. a first cross beam extending horizontally over said frame member;
 d. a second cross beam aligned parallel to said first cross beam and extending horizontally beneath said frame member;
 e. a first motor to generate movement of said frame member in the X-direction;
 f. an X axis controller connected to said first motor;
 g. a second motor to generate movement of said frame member in the Y-direction;
 h. a Y axis controller connected to said second motor;
 i. a scanner;
 j. a sewing machine head attached to said first cross beam and having a source of thread;
 k. a sewing needle extending from said sewing machine head and positioned to sew threads into said fabric while the frame member and structure move underneath said first cross beam and above said second cross beam;
 l. a sewing machine plate attached to said second cross beam and aligned with said sewing machine head and sewing needle;
 m. a process controller connected to said X axis controller through an X input and to said Y axis controller through a Y input;
 n. said process controller connected to a source of power;
 o. said process controller further comprising a memory to store machine readable patterns; and
 p. said process controller further comprising a scanner interface card;
 q. whereby a predrawn pattern can be read by said scanner which automatically converts the pattern into machine readable language, the pattern is stored in the memory of the process controller and the pattern is duplicated on the fabric through commands from the process controller which causes said frame member to move relative to said first and second cross-beam to thereby bring locations on the fabric into alignment with said sewing needle as the pattern is sewn into said fabric.

41. An apparatus in accordance with claim 40 wherein said fabric is a bedspread.

42. An apparatus in accordance with claim 40 wherein said fabric is a quilt.

43. An apparatus in accordance with claim 40 wherein said sewing machine head and said frame member are aligned such that said sewing needle is at the approximate center point of said fabric and said frame member can move relative to said sewing machine head and said sewing needle so as to permit the sewing needle to reach any portion of the surface area of the fabric.

44. An apparatus in accordance with claim 40 wherein said sewing machine head is equipped with a computer to control the sewing and stitching functions.

45. An apparatus in accordance with claim 44 wherein an operator can trace a straight-line pattern into the process controller and a software program in the process controller combined with the computer on the sewing machine head will enable the pattern to be automatically modified into a zig-zag or any other desired pattern.

46. An apparatus for sewing thread into fabric comprising:
 a. a first structure supporting a sewing machine head having a sewing needle and a source of thread;
 b. a second structure supporting the fabric in a position relative to said sewing needle so that thread may be sewn into the fabric;
 c. said second structure capable of horizontal movement in the X-direction, the Y-direction, or any combination X-Y direction relative to said sewing needle;
 d. means for generating the horizontal movement of said second structure in the X-direction, the Y-direction, or any combination X-Y direction;
 e. a scanner;
 f. a process controller having an X input and a Y input connected to said means for generating horizontal movement of the second structure;
 g. a source of power connected to said process controller;
 h. said process controller further comprising a memory to store machine readable patterns;
 i. said process controller further comprising a scanner interface card; and
 j. said sewing machine head is equipped with a computer to control the sewing and stitching functions;
 k. whereby a predrawn pattern can be read by said scanner which automatically converts the pattern into machine readable language, the pattern is stored in the memory of the process controller and the pattern is duplicated on the fabric through commands from the process controller which causes said second structure to move relative to said first structure to thereby bring locations on the fabric into alignment with said sewing needle as the pattern is sewn into said fabric and wherein an operator can trace a straight-line pattern into the process controller and a software program in the process controller combined with the computer on the sewing machine head will enable the pattern to be automatically modified into a zig-zag or any other desired pattern.

47. An apparatus in accordance with claim 46 wherein said fabric is a bedspread.

48. An apparatus in accordance with claim 46 wherein said fabric is a quilt.

49. An apparatus in accordance with claim 46 wherein said sewing machine head and said second structure are aligned such that said sewing needle is at the approximate center point of said fabric and said second structure can move relative to said sewing machine head and said sewing needle so as to permit the sewing needle to reach any portion of the surface area of the fabric.

50. The method of repetitively sewing a pattern into a fabric having a large surface comprising:
 a. positioning a sewing machine head having a source of thread and a sewing needle relative to said fabric;
 b. retaining said fabric on a movable structure which can be made to move in a horizontal direction relative to the sewing needle and which can cause a portion of the surface of the fabric to be reached by the sewing needle so that thread can be sewn into the fabric;
 c. controlling the movement of the movable structure relative to the sewing needle by a process controller;
 d. creating a pattern on a monitor through use of a cursor and cursor movement apparatus combined with a computer aided design program which converts the pattern into machine readable language;
 e. storing the machine readable pattern in the memory of said process controller; and
 f. mapping the completed pattern on a computer grid to select where the pattern is to be duplicated on said fabric;
 g. whereby the process controller can cause the movement of the movable structure relative to the sewing needle to thereby duplicate the pattern stored in its memory at any multiplicity of desired locations.

51. The method of repetitively sewing a pattern into a fabric having a large surface comprising:
 a. positioning a sewing machine head having a source of thread and a sewing needle relative to said fabric;
 b. retaining said fabric on a movable structure which can be made to move in a horizontal direction relative to the sewing needle and which can cause a portion of the surface of the fabric to be reached by the sewing needle so that thread can be sewn into the fabric;
 c. controlling the movement of the movable structure relative to the sewing needle by a process controller;
 d. duplicating a predrawn pattern by causing it to be read by a scanner which then converts the pattern into machine readable language;
 e. storing the machine readable pattern in the memory of said process controller;
 f. mapping the completed pattern on a computer grid to select where the pattern is to be duplicated on said fabric;
 g. controlling the sewing and stitching functions by a separate computer in the sewing machine head which receives commands from said process controller;
 h. whereby the process controller can cause the movement of the movable structure relative to the sewing needle to thereby duplicate the pattern stored in its memory at any multiplicity of desired locations and can modify sewing and stitching functions by commands to the computer in the sewing machine head.

* * * * *